United States Patent

[11] 3,575,327

| [72] | Inventor | Toney Harrison |
| --- | --- | --- |
| | | 4619 McPherson, St. Louis, Mo. 63108 |
| [21] | Appl. No. | 799,758 |
| [22] | Filed | Feb. 17, 1969 |
| [45] | Patented | Apr. 20, 1971 |

[54] FISHING ROD CARRYING CASES
2 Claims, 3 Drawing Figs.

[52] U.S. Cl. .................................................. 224/55,
43/26, 150/52
[51] Int. Cl. ...................................................... A01k 97/08
[50] Field of Search ............................................ 224/55, 52;
150/52, 52.2; 43/26

[56] References Cited
UNITED STATES PATENTS
| 2,551,929 | 5/1951 | Collins | 150/52X |
| 2,854,775 | 10/1958 | Kleckley | 150/52X |

*Primary Examiner*—Robert G. Sheridan
*Attorney*—Roger M. Hibbits

ABSTRACT: A fishing rod carrying case, as best shown in FIG. 1, constructed from an essentially rectangular panel or sheet or flexible material. Pockets are mounted on said sheet, disposed along two opposite edges of said panel, and opening inwardly. Attaching means in the form of tie strings are attached to said sheet surface in proximate alignment with the pockets so that when one end of a rod or rod segment is inserted in one of the pockets the rod is secured to the sheet by means of the tie strings. The tie strings and pockets are disposed so that the rods are essentially parallel to each other when secured. The carrying case is assembled for transportation by rolling in a direction transverse to the affixed rods. Tie strings are affixed to an edge of said panel which is parallel to said rods so that said carrying case is secured in its rolled configuration. Carrying means consisting of a strap with hook means at opposite ends thereof is coupled to the rolled up case.

Patented April 20, 1971  3,575,327
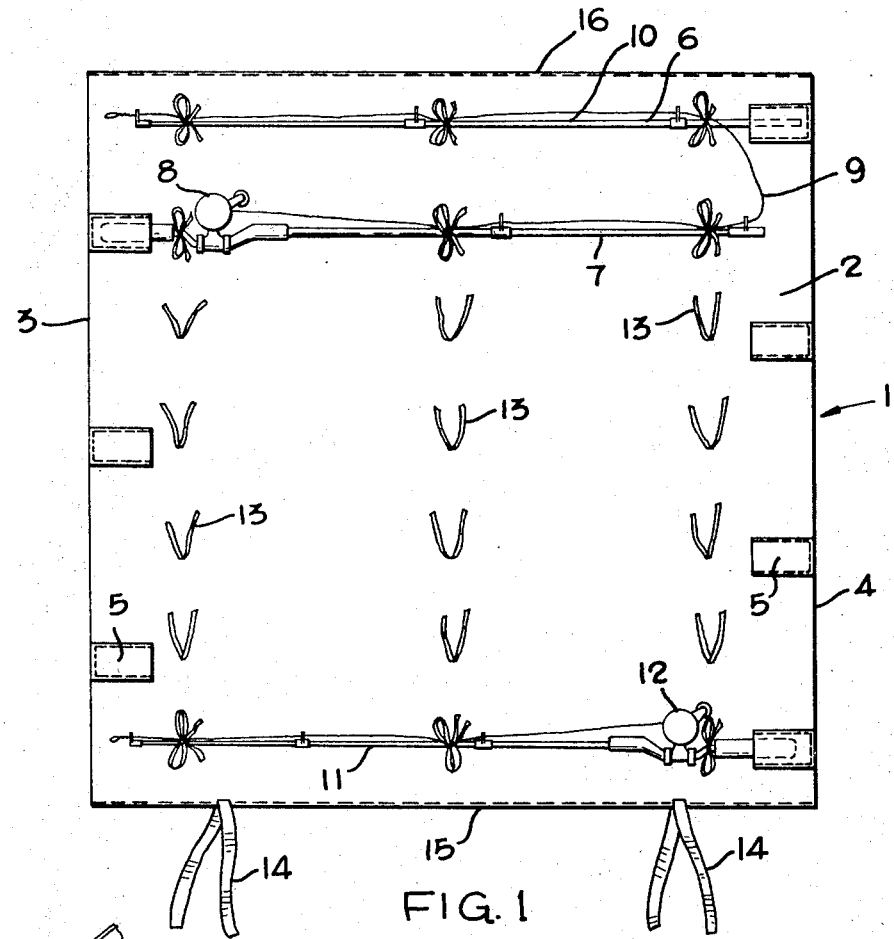
FIG. 1
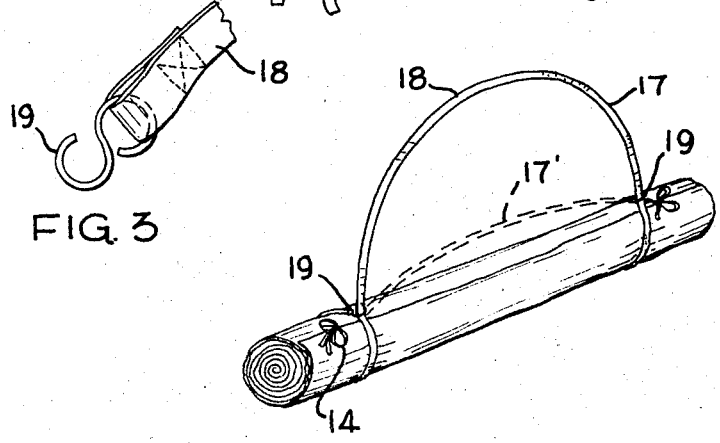
FIG. 3
FIG. 2
Inventor
TONEY HARRISON
By Roger M. Hibbits
Attorney

FISHING ROD CARRYING CASES

BACKGROUND OF THE INVENTION

Many articles are available today for carrying fishing rods and similar rigid elongated articles. Characteristics generally associated with such articles are zippers, rigid cases and specially formed supporting structures. These characteristics lend themselves to relative difficulty in manufacture, storage and use.

The ordinary person as a user of the class of device contemplated by the invention described herein desires low cost, flexibility in storage and ease of use. Low cost and ease of use implies simplicity in design.

SUMMARY OF THE INVENTION

In the present invention a fishing rod carrying case is contemplated which involves simplicity of design and ease of manufacture.

In the preferred embodiment it is conceivable that the entire invention may be fabricated from a single piece of flexible material and a pair of commercially available hooks.

It is an object of the present invention to provide a fishing rod carrying case which is economically and simply manufactured from materials which are readily and economically available.

It is another object of the present invention to provide a fishing rod carrying case which is simple and flexible in use.

It is a further object of the present invention to provide a fishing rod carrying case which may be stored readily and easily in a small space.

It is a further object of the present invention to provide a fishing rod carrying case which is easily and economically cleaned, repaired and maintained.

It is a further object of the present invention to provide a fishing rod carrying case which is useable without disassembly of rod, reel and line.

It is a further object of the present invention to provide a fishing rod carrying case which allows storage of assembled fishing rods.

BRIEF DESCRIPTION OF DRAWINGS

FIG. 1 is plan view of a fishing rod carrying case constructed in accordance with and embodying the present invention shown in its unrolled configuration.

FIG. 2 is a perspective view of a fishing rod carrying case constructed in accordance with and embodying the present invention shown in its rolled configuration.

FIG. 3 is a fragmentary perspective view of a portion of a carrying strap constructed in accordance with and embodying the present invention.

DETAILED DESCRIPTION OF INVENTION

Referring now in more detail and by reference characters to the drawings which illustrate practical embodiments of the present invention, FIG. 1 designates a fishing rod carrying case, 1, constructed in accordance with and embodying the present invention, shown in plan view.

The case, 1, comprises a flat rectangularly shaped sheet, 2, of flexible material such as cloth or plastic. Mounted along edges, 3, and, 4, of sheet, 2, are rectangular pockets, 5, which may be formed from flat sheets of material similar to that of sheet, 2, attached to sheet, 2, as shown in FIG. 1. Pockets, 5, open inwardly of sheet, 2, and are alternated between edges, 3, and, 4, of sheet, 2. By alternating the pockets, 5, as shown, when the thick portion of rod section, 6, is inserted into a pocket on edge, 4, the thick portion of an adjacent rod section, 7, should be inserted in a pocket on edge, 3, and in this manner case, 1, when rolled up takes the form of a cylinder with minimum variation in cross section.

As can be seen from FIG. 1, a rod and reel set, 10, comprised of rod sections, 6, and, 7, reel, 8, and line, 9, may be installed in case, 1, by simply separating section, 6, and, 7. It is unnecessary to remove reel, 8, or line, 9, to install the complete rod-and-reel set, 10, in case, 1. A rod, 11, and reel, 12, are shown in FIG. 1 fully assembled and installed in case, 1.

Rods and reels, rod sections and the like are secured to sheet, 2, by means of tiestrings, 13, as shown in FIG. 1. Three columns of tiestrings, 13, are shown in FIG. 1, however, this number of columns or their exact placement is not critical.

Tiestrings, 14, are shown mounted on edge, 15, of sheet, 2. To secure case, 1, for carrying. Sheet, 2, is rolled up starting at edge, 16, of sheet, 2, and rolling towards edge, 15. Case, 1, is secured in its rolled up configuration by means of tiestrings, 14, as shown in FIG. 2.

An aid for transporting case, 1, is provided by carrying strap, 17, which consists of strap, 18, provided with hooks, 19, attached to each end thereof. Strap, 17, may be attached, with slack, to allow the carrying case to be slung over a person's shoulder by looping strap, 18, about case, 1, feeding it through hook, 19, one time. Or strap, 17, may be attached without slack to case, 1, such as for hand carry by looping strap, 18, about case, 1, more than once, and then feeding it through hook, 19, as shown in dotted lines in FIG. 2.

While I have illustrated and described the preferred embodiments of my invention, it is to be understood that changes and modifications in the form, construction, arrangement and combination of the parts and steps of the fishing rod carrying case and methods of making and using the same may be substituted for those herein shown and described without departing from the nature and principle of my invention.

I claim:

1. A fishing rod carrying case comprising a flat sheet, said flat sheet of a flexible material and essentially rectangular in shape, a plurality of attaching means operably mounted on said flat sheet, said attaching means, comprising drawstrings and disposed so that a plurality of fishing rods of varying length may be attached to said sheet each rod being essentially parallel to said other rods, a plurality of pocket means alternately and operably mounted along opposite edges of said flat sheet, securing means operably mounted proximate to an edge of said flat sheet, said securing means securing said flat sheet in a rolled up configuration and carrying means operably coupled to said flat sheet.

2. A fishing rod carrying case comprising a flat sheet, said flat sheet of a flexible material and essentially rectangular in shape, a plurality of attaching means operably mounted on said flat sheet, said attaching means, comprising drawstrings and disposed so that a plurality of fishing rods of varying length may be attached to said sheet each rod being essentially parallel to said other rods, a plurality of pocket means alternately and operably mounted along opposite edges of said flat sheet, securing means operably mounted proximate to an edge of said flat sheet, said securing means securing said flat sheet in a rolled up configuration and carrying means operably coupled to said flat sheet, said carrying means comprising an elongated strap and hooks operably secured to each end of said elongated strap.